(12) United States Patent
Sreemanthula et al.

(10) Patent No.: US 8,959,587 B2
(45) Date of Patent: Feb. 17, 2015

(54) SYSTEM AND METHOD FOR AUTHENTICATION FOR WIRELESS EMERGENCY SERVICES

(75) Inventors: Srinivas Sreemanthula, Flower Mound, TX (US); Gabor Bajko, Mountain View, CA (US)

(73) Assignee: Nokia Corporation, Espoo (FI)

( * ) Notice: Subject to any disclaimer, the term of this patent is extended or adjusted under 35 U.S.C. 154(b) by 1141 days.

(21) Appl. No.: 12/530,942

(22) PCT Filed: Mar. 12, 2008

(86) PCT No.: PCT/IB2008/050901
§ 371 (c)(1),
(2), (4) Date: Oct. 6, 2009

(87) PCT Pub. No.: WO2008/110997
PCT Pub. Date: Sep. 18, 2008

(65) Prior Publication Data
US 2010/0122321 A1 May 13, 2010

Related U.S. Application Data

(60) Provisional application No. 60/894,443, filed on Mar. 12, 2007.

(51) Int. Cl.
*H04L 29/00* (2006.01)
*H04L 29/06* (2006.01)
*H04W 4/22* (2009.01)
*H04W 12/06* (2009.01)
*H04W 76/00* (2009.01)
*H04W 76/02* (2009.01)

(52) U.S. Cl.
CPC ............... *H04L 63/08* (2013.01); *H04L 63/162* (2013.01); *H04L 63/205* (2013.01); *H04W 4/22* (2013.01); *H04W 12/06* (2013.01); *H04W 76/007* (2013.01); *H04W 76/02* (2013.01)
USPC .............................................. 726/3; 713/168

(58) Field of Classification Search
None
See application file for complete search history.

(56) References Cited

U.S. PATENT DOCUMENTS

| 6,957,060 | B1 * | 10/2005 | Sharp ............................ 455/410 |
| 7,787,600 | B1 * | 8/2010 | Bari ................................. 379/45 |
| 2006/0154645 | A1 | 7/2006 | Valkenburg | |

FOREIGN PATENT DOCUMENTS

WO  2005109930 A  11/2005

OTHER PUBLICATIONS

Computer-generated translation of International Application Publication WO 2005/109930, pp. 1-4.*
Formal Translation of WO 2005/109930 A2.*
Aboba, Microsoft, L Blunk, Merit Network, et al., "Extensible Authentication Protocol (EAP); rfc3748.txt" IETF Standard, Internet Engineering Task Force, IEF, CH, Jun. 1, 2004, XP015009528.

(Continued)

*Primary Examiner* — Minh Dinh
(74) *Attorney, Agent, or Firm* — Mintz Levin Cohn Ferris Glovsky and Popeo, P.C.

(57) ABSTRACT

A method of authenticating a user device includes transmitting a request, the request including a query for information, and receiving an identifier, the identifier being associated with one or more authentication mechanisms for obtaining access to emergency services.

21 Claims, 10 Drawing Sheets

(56) References Cited

OTHER PUBLICATIONS

"International Search Report and the Written Opinion of the International Searching Authority", received in corresponding PCT Application No. PCT/IB2008/050901, Dated Sep. 3, 2008, 14 pages.
Aboba, Microsoft, M Beadles, Worldcom Advanced Networks, "Network Access Identifier" (NAI); rfc2486.txt, IETF Standard, Jan. 1999.
Office Action received in corresponding Korean Application No. 10-2009-7021237, Dated Nov. 29, 2011, 8 pages.
Office Action received from corresponding European Patent Application No. 08737617.4, dated Jan. 24, 2011, 4 pages.
Office Action received from corresponding Korean Patent Application No. 2009-70211237, dated Apr. 18, 2011, 10 pages.
IEEE Standard for Local and metropolitan area networks Part 16: Air Interface for Broadband Wireless Access Systems IEEE New York, NY, IEEE 802.16, May 29, 2009.
IEEE Standard for Information technology—Telecommunications and information exchange between systems—Local and metropolitan area networks—Specific requirements Part 11: Wireless LAN Medium Access Control (MAC) and Physical Layer (PHY) Specifications IEEE Computer Society IEEE 802.11, 2007.
IEEE Standard forinformation technology—Telecommunications and information exchangebetween systems—Local and metropolitan area networks—Specific requirementsPart 11: Wireless LAN Medium AccessControl (MAC)and Physical Layer (PHY) Specifications Sponsored by the LAN/MANStandards Committee IEEE New York, NY Feb. 25, 2011 IEEE Std 802.11u™-2011.

* cited by examiner

| 122 | 124 | 126 |
|---|---|---|
| Type code = "e911_auth_id" | Length | Value = "sos_auth" |

<result>
<binding name="e911_auth_id">
<literal>sos_auth</literal>
</binding>
</result>
```
130

<result>
<binding name="e911_auth_id_pair">
<literal>sos_tls_auth</literal> </binding>
<binding name="auth_type">
<literal>eap_tls</literal> </binding>
<binding name="e911_auth_id">
<literal>sos_tls_auth</literal> </binding>
</result>

```
150

SYSTEM AND METHOD FOR AUTHENTICATION FOR WIRELESS EMERGENCY SERVICES

RELATED APPLICATION

This application was originally filed as PCT Application No. PCT/IB2008/050901 filed Mar. 12, 2008 which claims priority to U.S. Provisional Application No. 60/894,443 filed Mar. 12, 2007.

FIELD OF THE INVENTION

The present invention relates generally to the field of wireless communication. More particularly, the present invention relates to accessing emergency services by a wireless device.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In order to gain access to emergency services through a wireless user device, such as a portable telephone, the user device needs to authenticate itself with proper credentials to the network and vice versa. In an IEEE 802.11 system, this is typically done with the user device providing user identity in extensible authentication protocol (EAP) messages enveloped in 802.1x protocol messages to a network access point (AP) and then from AP to an authentication server via a any of a variety of protocols, such as the Remote Authentication Dial-In User Service (RADIUS), for authentication purposes. After a successful EAP exchange, the user device is authenticated, and a pair-wise master key (PMK) is generated by the user device and the AP. A 4-way handshake between the user device and the AP generates session keys (pair-wise transient keys, or PTK). At the end of the EAP exchange and 4-way handshake, entity authentication is completed to allow opening of the 802.1x controlled ports on the AP. Further, key management for confidentiality, data origin authenticity and replay detection services is made available.

The user device is then able to use the wireless network to initiate any services, including emergency calls that provides link confidentiality, using the keys generated. A similar mechanism is realized for authentication and key management in other wireless link technologies (e.g., IEEE 802.16e).

Issues with the above-described mechanism arise in light of a U.S. Federal Communications Commission ruling which indicates that the user must be able to make emergency calls and connected to local public safety answering points (PSAP) regardless of the validity of the user security credentials. In order to allow emergency calls from clients with incorrect or no credentials, the wireless network may choose to operate an open authentication system service identification (SSID) that requires no credentials. However, in this case, there is no involvement of session key derivations and thus, no security features offered due to the key management mechanism as indicated above.

Alternatively, the wireless network may choose operate a security-enabled SSID, such as Wifi Protected Access (WPA) or WAP2 or any other future security certifications from WiFi Alliance, that requires authentication by use of some well known identifiers for clients to use to gain emergency access which will be used for EAP exchange for an emergency-aware authentication mechanism. In this case, however, it may not be possible to standardize the identifiers due to lack of this responsibility in any particular standards body. However, use of the identifiers alone does not provide all the security features but only a dummy authentication. Further, it is undesirable to provide an identifier to the user devices for emergency use before attachment or association to the network that would be used for an emergency-aware authentication. For example, there may be no link security available, but only authentication to access the network. Additionally, in order for derivation of keys for link security, one of the specific authentication mechanisms as determined by the authentication server must be exchanged. However, there is the possibility that the mobile device may not support the mechanism determined by the authentication server.

SUMMARY OF THE INVENTION

These and other advantages and features of various embodiments of the present invention, together with the organization and manner of operation thereof, will become apparent from the following detailed description when taken in conjunction with the accompanying drawings, wherein like elements have like numerals throughout the several drawings described below.

One aspect of the invention relates to a method comprising transmitting a request, the request including a query for information, and receiving an identifier, the identifier being associated with one or more authentication mechanisms for obtaining access to emergency services.

Another aspect of the invention relates to an apparatus comprising a processor and a memory unit communicatively connected to the processor. The processor includes computer code for transmitting a request, the request including a query for information, and computer code for receiving an identifier, the identifier being associated with one or more authentication mechanisms for obtaining access to emergency services.

In another aspect, the invention is a computer program product, embodied in a computer-readable medium, for a pre-authentication process for a user device. The computer program product comprises computer code for transmitting a request, the request including a query for information, and computer code for receiving an identifier, the identifier being associated with one or more authentication mechanisms for obtaining access to emergency services.

Another aspect of the invention relates to a method comprising receiving a request from a user device and transmitting an identifier, the identifier being associated with one or more authentication mechanisms for obtaining access to emergency services.

Another aspect of the invention relates to a method comprising receiving a query for information from a user device; transmitting a request to an information server for an identifier for the user device; receiving an identifier from the information server, the identifier being associated with one or more authentication mechanisms for obtaining access to emergency services; and transmitting the identifier to the user device.

Another aspect of the invention relates to a method comprising transmitting an identifier for receipt by an authentication server, the identifier being associated with one or more authentication mechanisms for obtaining access to emergency services, and obtaining access to emergency services through the authentication server.

Another aspect of the invention relates to a method comprising receiving an identifier for a user device, the identifier being associated with one or more authentication mechanisms for obtaining access to emergency services; authenticating the user device based on the identifier; and allowing access to emergency services to the user device.

Another aspect of the invention relates to a method comprising receiving an identifier from a user device, the identifier being associated with one or more authentication mechanisms for obtaining access to emergency services; transmitting the identifier to an authentication server; and receiving an authentication from the authentication server based on the identifier, the authentication allowing access to the user device to emergency services.

In one embodiment, the processing includes transmitting the identifier to an authentication server to obtain access to network emergency services.

In one embodiment, the receiving a communication comprises transmitting a request to the information server through a network access point. The communication with the network access point may be in accordance with an IEEE 802.1x protocol.

In one embodiment, the identifier is associated with the type of the identifier by way of a tuple formed by the identifier and the indication of the type.

In one embodiment, the type of the identifier is selected as being supported by the user device.

In one embodiment, the identifier is in a Type-Length-Value (TLV) format. In another embodiment, the identifier is in a Resource Description Framework (RDF) format.

These and other advantages and features of various embodiments of the present invention, together with the organization and manner of operation thereof, will become apparent from the following detailed description when taken in conjunction with the accompanying drawings, wherein like elements have like numerals throughout the several drawings described below

BRIEF DESCRIPTION OF THE DRAWINGS

Embodiments of the invention are described by referring to the attached drawings, in which:

FIG. 2 illustrates a user device identifier according to an embodiment of the present invention;

FIG. 3 illustrates a user device identifier according to another embodiment of the present invention;

DETAILED DESCRIPTION OF THE VARIOUS EMBODIMENTS

Figure 1:
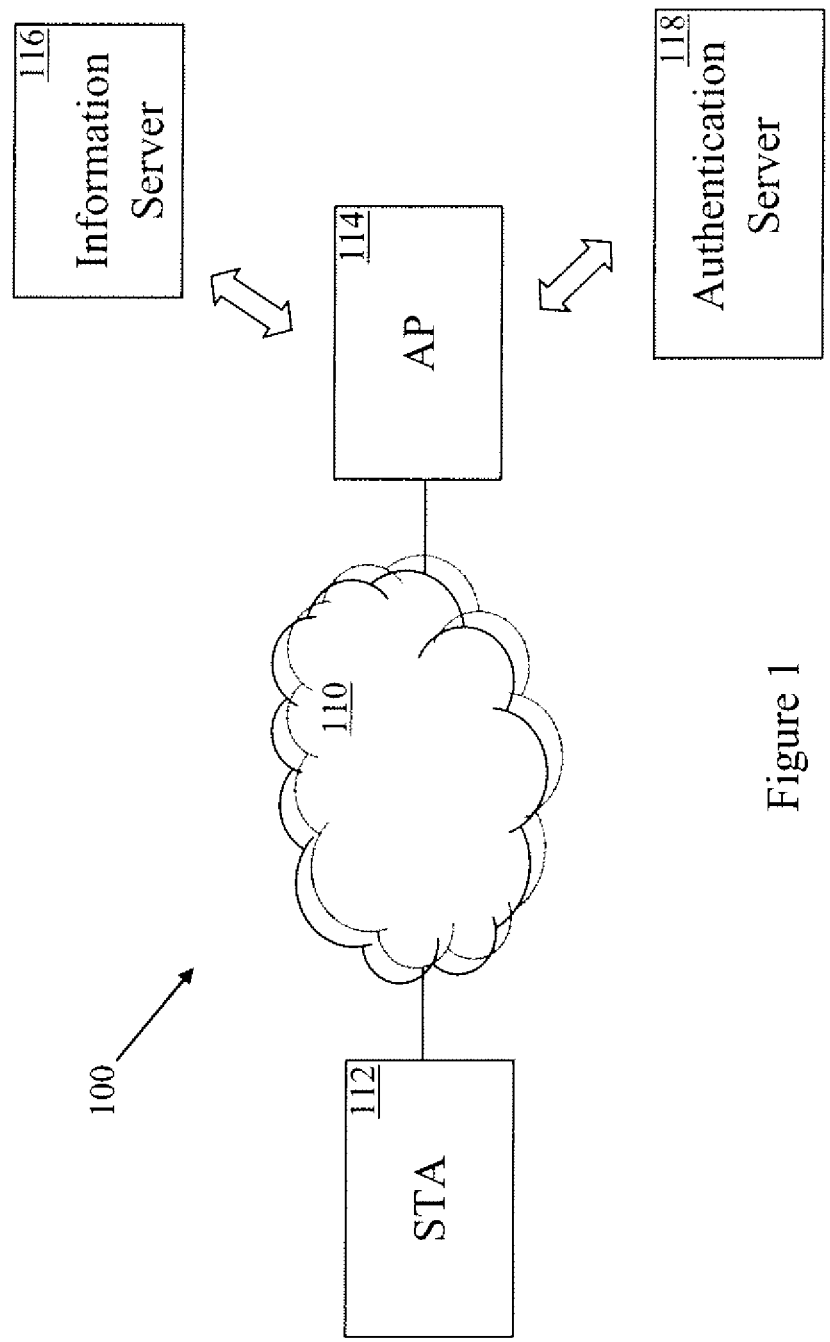
FIG. 1 is block diagram illustrating a system in which embodiments of the present invention may be implemented.

Referring now to FIG. 1, a block diagram of a system 100 in which embodiments of the present invention may be implemented is illustrated. A user device 112, such as a portable phone, personal digital assistant or other such device, is adapted to communicate with a network access point 114 through a communication system 110. In a preferred embodiment, communication between the user device 112 and the access point 114 is according to an IEEE 802.11 system.

The access point 114 is adapted to communicate with an information provider, such as an information server 116. The information server 116 is a backend server adapted to manage the assignment of identifiers for emergency information. The communication between the access point 114 and the information server 116 may be through any of a variety of modes of communication. The information server 116 may be maintained within the network associated with the access point 114 or may be outside the network.

The access point 114 is further adapted to communicate with an authentication server 118. As noted above, the authentication server 118 may be a RADIUS server which controls and manages access to emergency services. Communication between the access point 114 and the authentication server 118 may be through any of a variety of modes of communication.

According to embodiments of the present invention, the establishment of identifiers tied to a specific authentication type can indicate any of dummy, open or any other authentication types. This can be specified in any standardization body or published in some place for public use. While conventional systems provide no way for a user device to know the authentication mechanism to be used by the authentication server until the authentication server triggers a specific mechanism, embodiments of the present invention provide the type of specific authentication type through the identifier. Specifically, the use of the identifier according to embodiments of the present invention in the authentication messages provides a choice from the point of view of the user device to specifically indicate to the authentication server to use a specific authentication mechanism or algorithm.

Embodiments of the present invention implement a generic information exchange mechanism prior to association or registration. The information exchange mechanism provides information related to one or more identifiers for user devices to use when they have an incorrect or no security credentials. The identifiers are used by the user devices for authentication to gain network access to emergency services. This identifier may be used in an EAP message exchange with the authentication server that determines the need for authentication for emergency use based on this identifier. The authentication server can return a success message indicating a dummy authentication with no EAP exchanges, or it might trigger any EAP mechanism that may further obtain additional information before granting a dummy authenticated access.

In other embodiments, this mechanism and the provision of an authentication mechanism associated to each identifier are used as a tuple indicating the use of an identifier to a specific authentication mechanism. This may be useful in cases where the user device supports a specific authentication mechanism and chooses to have a session key generation for link security reasons by use of this particular identifier. For example, two identifiers may be provided, one for dummy authentication and one of EAP transport layer security (TLS). The dummy authentication results in no link security but the one for EAP TLS may be capable of MSK/PMK generation and distribution at the client and to the access point, respectively, that results in some form of link security.

Referring now to FIG. 2, an identifier according to an embodiment of the present invention is illustrated. In this embodiment, the identifier is represented in a Type-Length-Value (TLV) format to include the type of identifier 122, length of the value 124 and the identifier value information 126. The type of identifier 122 used for authentication to gain access for emergency use may take the format of a Network Access Identifier (NAI), as defined in RFC 2486. The TLV format is a generic definition capable of being transported over any protocol message (e.g. IEEE 802.21 or RADIUS or Diameter).

In another embodiment, illustrated in FIG. 3, an identifier 130 may be represented in Resource Description Framework (RDF) query language (e.g., SPARQL). The RDF query language may be specific to only certain protocols (e.g., IEEE 802.21).

In accordance with embodiments of the present invention, the identifier may be tagged with an authentication mechanism. For example, the identifier may be tagged with an authentication mechanism to form a tuple applicable to the identifier, as described below with reference to FIGS. 4 and 5.

Figures 4, 5:
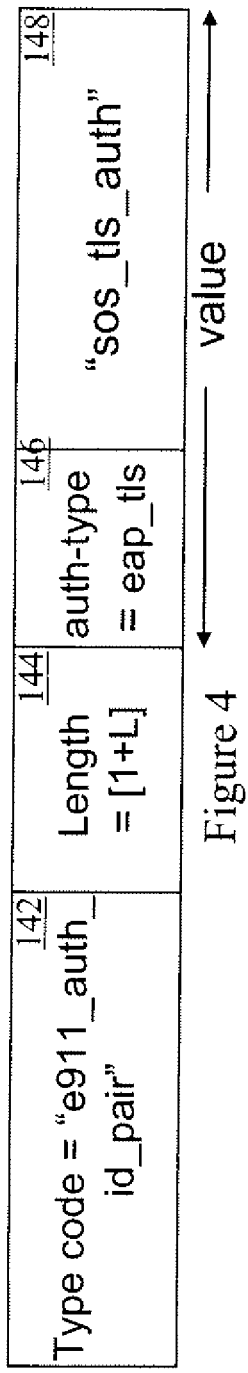
FIG. 4 illustrates a user device identifier according to another embodiment of the present invention.
FIG. 5 illustrates a user device identifier according to another embodiment of the present invention.

FIGS. 4 and 5 illustrate embodiments in which the identifier is associated with a specific authentication mechanism to form a tuple. For example, FIG. 4 illustrates an identifier in TLV format of such a tuple. In this case, the identifier value includes an authentication type 146 in addition to the value of the authentication code 148. Similarly, FIG. 5 illustrates an embodiment of an identifier 150 in RDF query language format. In this case, it should be noted that a tuple can be repeated for multiple identifiers. The authentication type may be any of the EAP types defined in the EAP registry maintained by Internet Assigned Numbers Authority (IANA) at: www.iana.org/assignments/eap-numbers.

Figure 6:
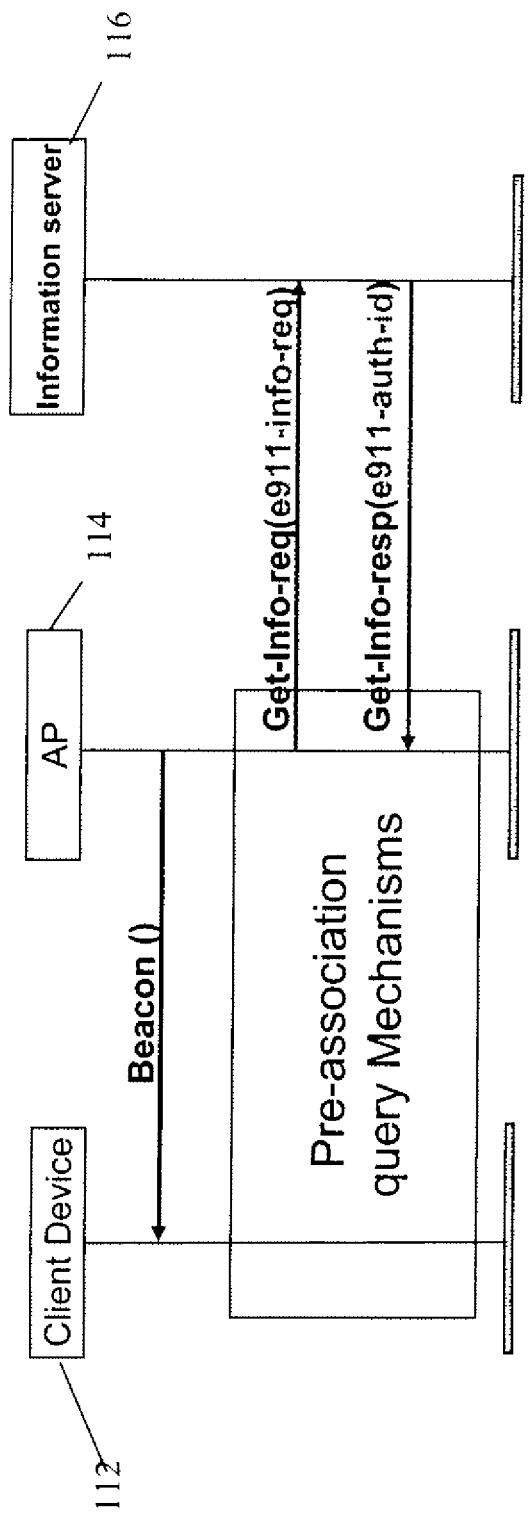
FIG. 6 illustrates an exchange to complete authentication identifier acquisition according to an embodiment of the present invention.

Referring now to FIG. 6, an exchange is illustrated by way of which a user device 112 may obtain an identifier in a pre-authentication process according to an embodiment of the present invention. The user device communicates with an access point through an IEEE 802.11 network. Through the illustrated exchange, a pre-association query mechanism for client devices such as user device 112 may query information from a backend server, such as the information server 116. As noted above, the information server 116 may be contacted by the network access point 114 through any protocol. In the exchange, pursuant to a request by the client device 112, the access point 114 transmits a query to the information server 116, identifying the requested information. The response information from the information server includes the identifier for emergency information, which can be transmitted to the user device 112 by the access point 114.

Figure 7:
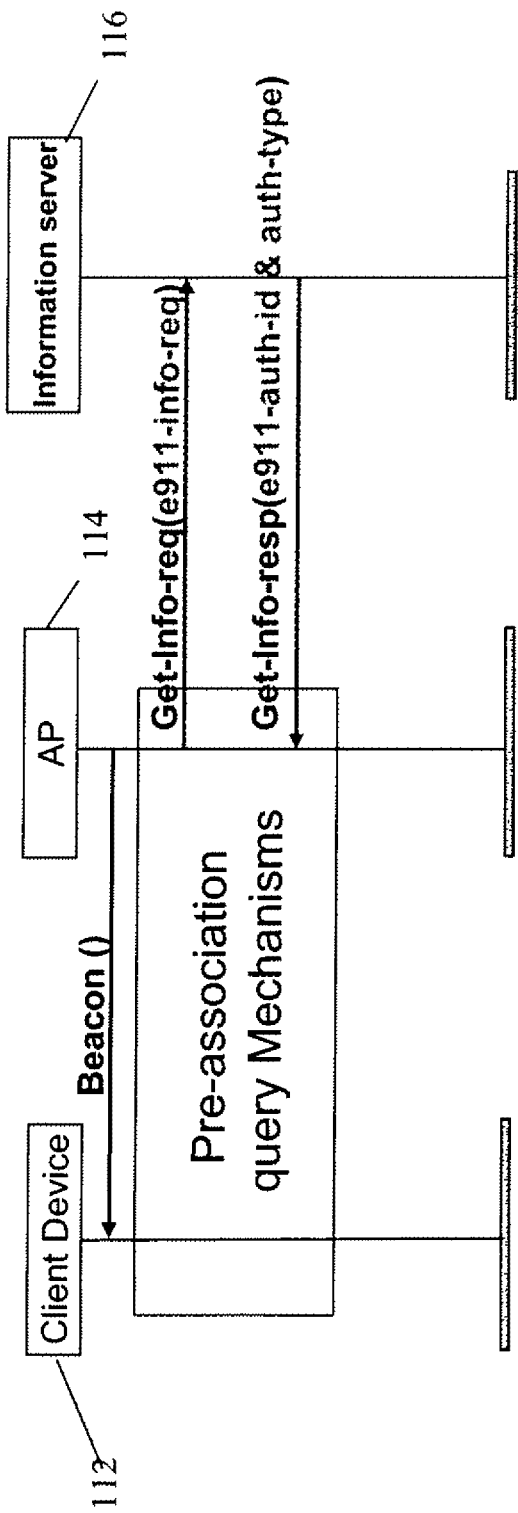
FIG. 7 illustrates an exchange to complete authentication identifier acquisition according to another embodiment of the present invention.

FIG. 7 illustrates another embodiment of an exchange by way of which a user device 112 may obtain an identifier. Similarly to the embodiment illustrated in FIG. 6, the exchange illustrated in FIG. 7 includes a query, or a request, from the access point 114 to the information server 116. In the embodiment of FIG. 7, in addition to the identifier, an authentication type is included in the response from the information server to the access point 114. This authentication type pair is provided to the user device 112 using IEEE 802.11 communication. As noted above, the information server may be maintained locally within the network and configured to provide this information in coordination with the mechanisms and identifiers recognized by an authentication server, such as a RADIUS server or a AAA server. In one embodiment, the information server 116 could be a RADIUS server (or other authentication server) itself.

Figure 8:
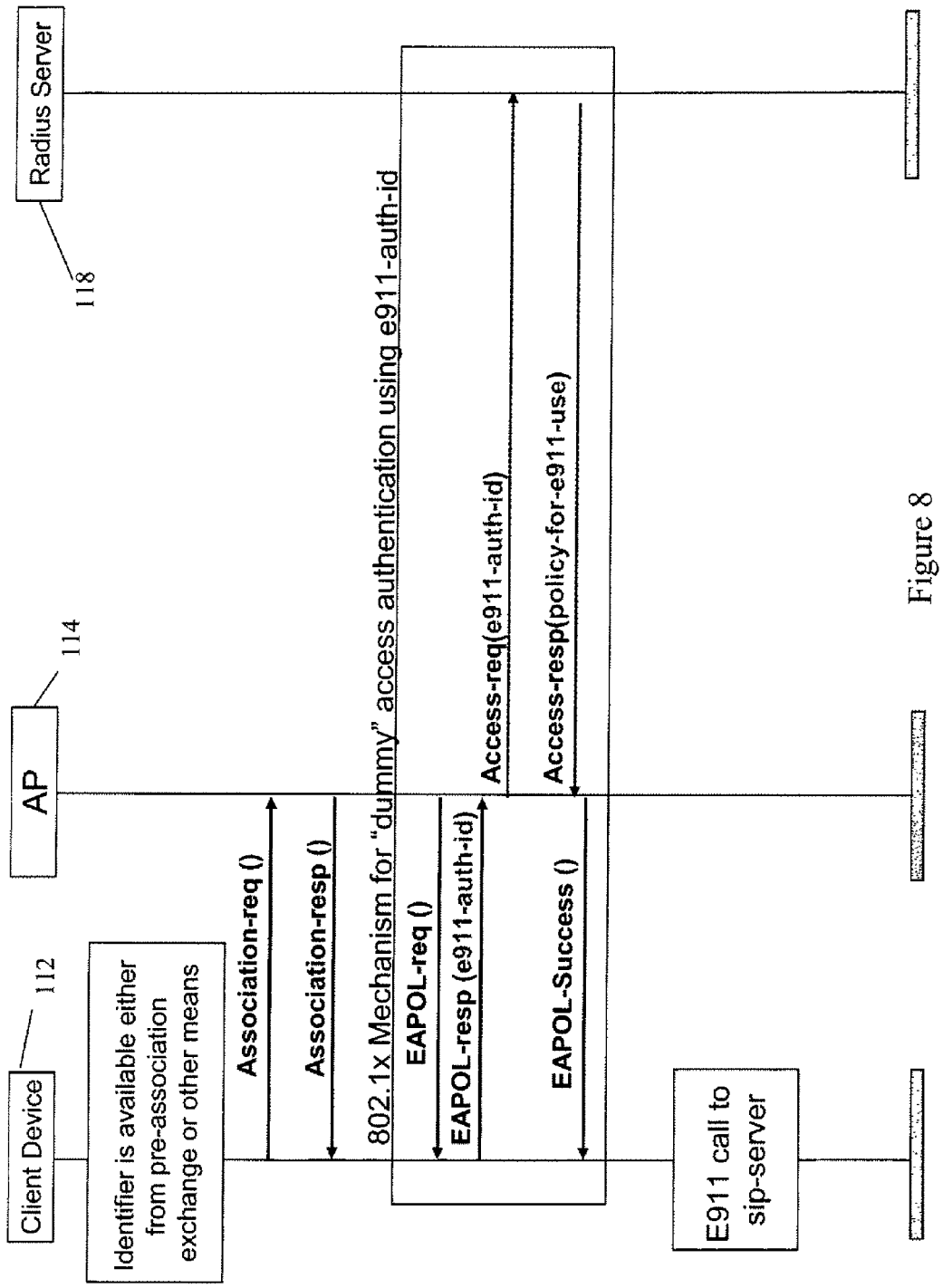
FIG. 8 illustrates an exchange to provide emergency services access to the user device according to an embodiment of the present invention.

In FIG. 8, an embodiment of an exchange with the authentication server is illustrated by way of which a "dummy emergency" authentication is carried out. This exchange is associated with the exchange illustrated in FIG. 6, which provides the user device 112 with an identifier. Again, the communication between the user device 112 and the authentication server is an IEEE 802.1x exchange. Pursuant to a request from the user device 112, the access point 114 responds to the user device 112 and initiates an exchange with the authentication server using the authorization identifier provided by the user device 112. The authentication server accepts the authentication due to the identifier in the EAP-Response/Identity (enveloped in EAPOL-Resp), and provides the policy or filtering rules to the access point 114 to indicate how to handle the traffic from this user device 112. After authentication, the 802.1x ports are open for emergency call use. In this embodiment, the authentication server only performs access authentication without any key management procedures required for link security applications. Due to the lack of a PMK, 4-way message exchange at the user device 112 and the access point 114 is not triggered.

Figure 9:
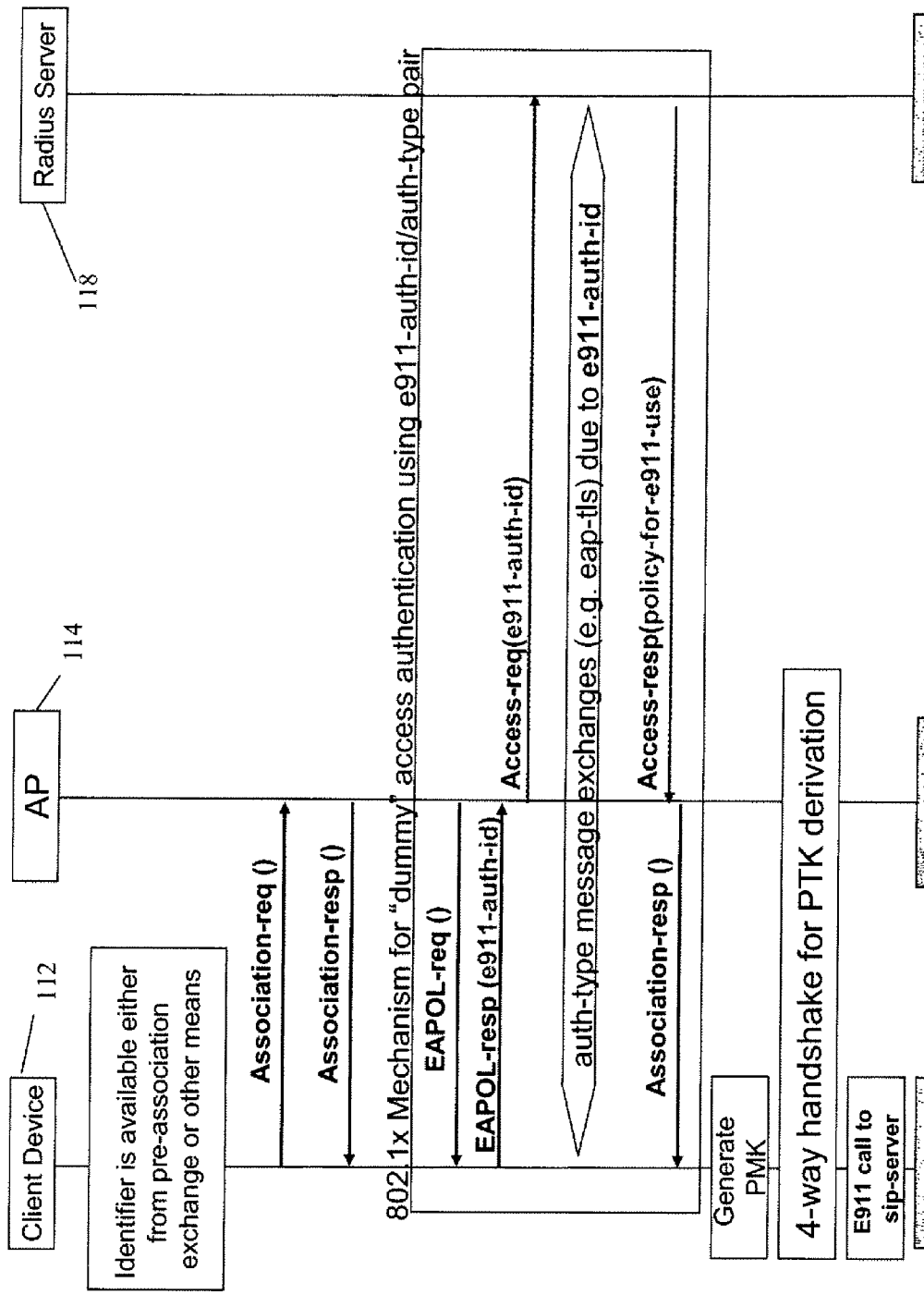
FIG. 9 illustrates an exchange to provide emergency services access to the user device according to an embodiment of the present invention.

Referring now to FIG. 9, the "emergency" authentication is carried out in an IEEE 802.1x exchange according to another embodiment of the present invention. This exchange is associated with the exchange illustrated in FIG. 7, which provides the user device 112 with an identifier as well as an authentication type. In the embodiment of FIG. 9, pursuant to a request from the user device 112, the access point 114 responds to the user device 112 and initiates an exchange with the authentication server 118 using the authorization identifier provided by the user device 112. The authentication server 118 accepts the authentication after performing some authorization-type-specific exchanges. These exchanges are due to recognition of the identifier from the user device 112 in the EAP-Response/Identity (enveloped in EAPOL-Resp). The authorization-type-specific exchange results in the generation of a pairwise key. Those skilled in the art will appreciate that such authentication message exchanges for pairwise key generation without a long term secret key may take several forms, each of which are contemplated within the scope of the present invention. The authentication server 118 provides the pairwise key and the policy or filtering rules to the access point 114 to indicate how to handle the traffic from this client. After authentication, the 802.1x ports are open for emergency call use. In the embodiment of FIG. 9, a 4-way handshake is triggered from PMK availability for PTK derivation that enables link security applications.

Thus, embodiments of the present invention provide the use of identifiers as indicators to specific authentication types to authentication servers to trigger related authentication mechanisms. Identifiers are not required to be advertised on the air since they can be long and be bandwidth wasteful to include in broadcast messages. Identifiers for emergency use need not be standardized and can be flexibly configured by the network service providers for various link technologies and provided in information exchange. Further, identifiers can be applicable to more that one link technology since it is identified at the authentication server level that can have an administrative scope to include multiple link technologies Embodiments of the present invention are transparent to the access point 114 and, therefore, no changes are required to the link broadcast information. Further, no changes are needed for AP implementation to allow this mechanism and can be backward compatible to older versions.

Embodiments of the present invention can use authentication mechanisms with incorrect or no credentials that would enable PMK generation and further key management exchange to derive pairwise session keys. Further, embodiments of the present invention support different authentication mechanisms for different levels of security features by use of pairings with identifier and authentication mechanism combination. Distribution of this information prior to association is beneficial to allow the user device 112 to choose what identifier and what mechanisms to use for authentication in the emergency user when no credentials are available. The user device 112 has the choice to select the identifier and, thus, the corresponding authentication mechanism.

Figure 10:
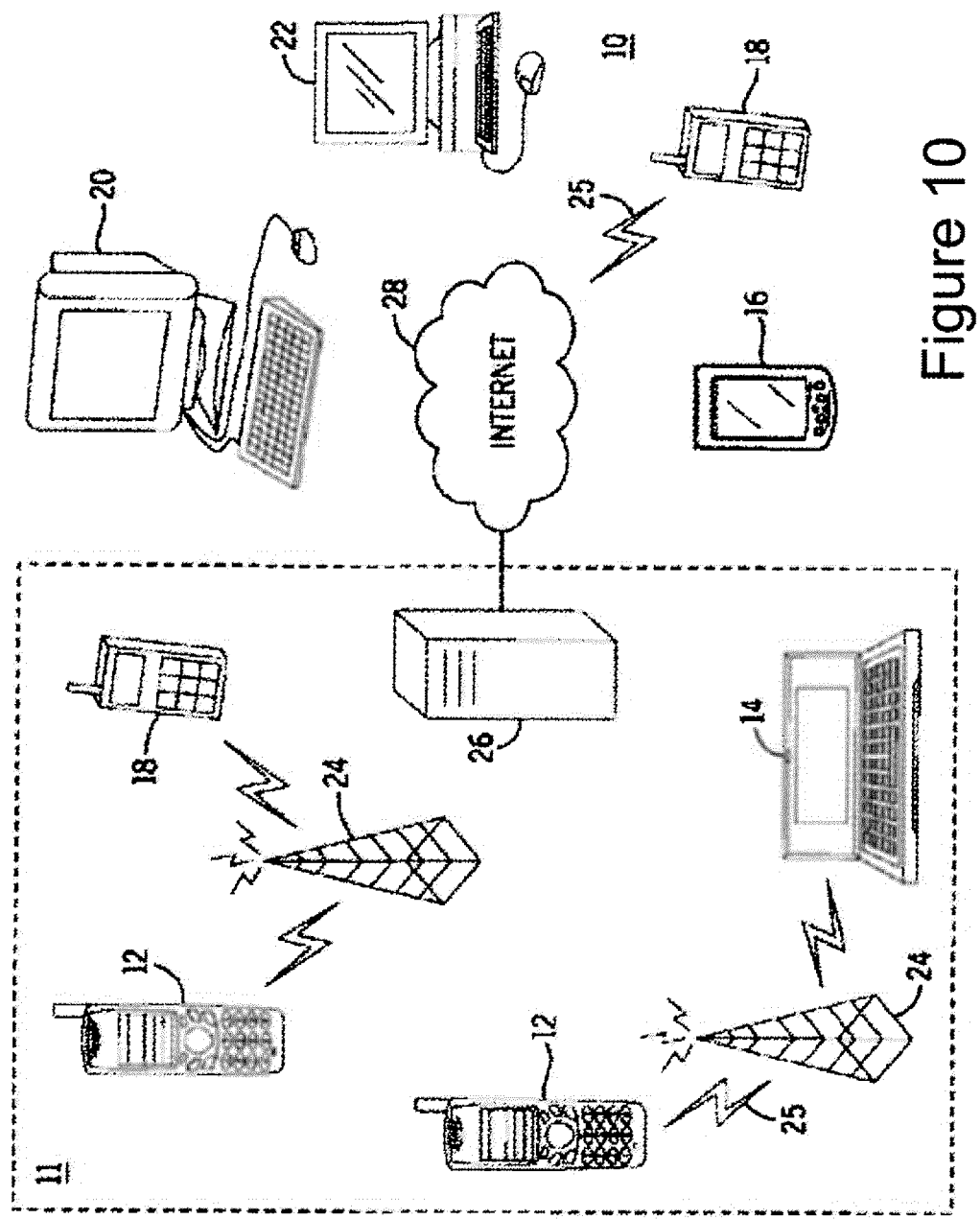
FIG. 10 is an overview diagram of a system within which various embodiments of the present invention may be implemented.

FIG. 10 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 10 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 11:
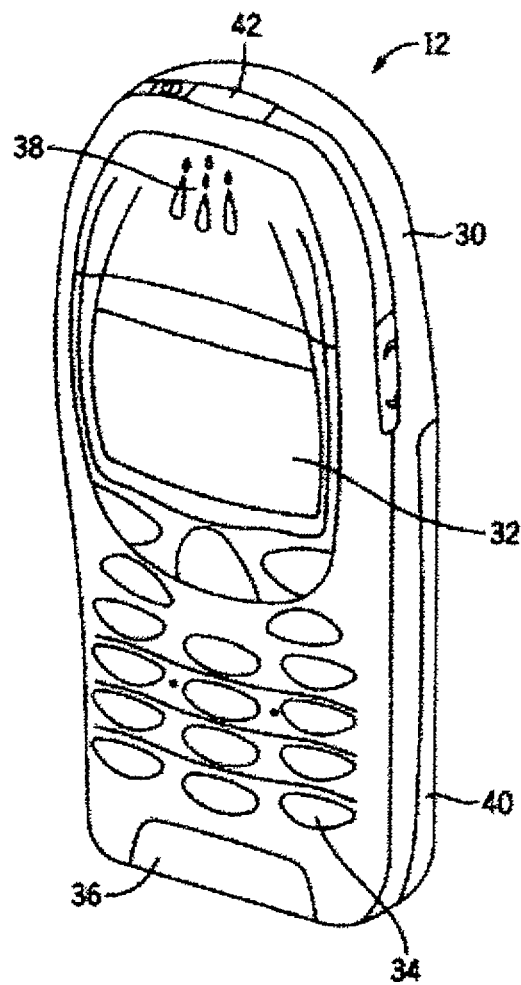
FIG. 11 is a perspective view of an electronic device that can be used in conjunction with the implementation of various embodiments of the present invention.
Figure 12:
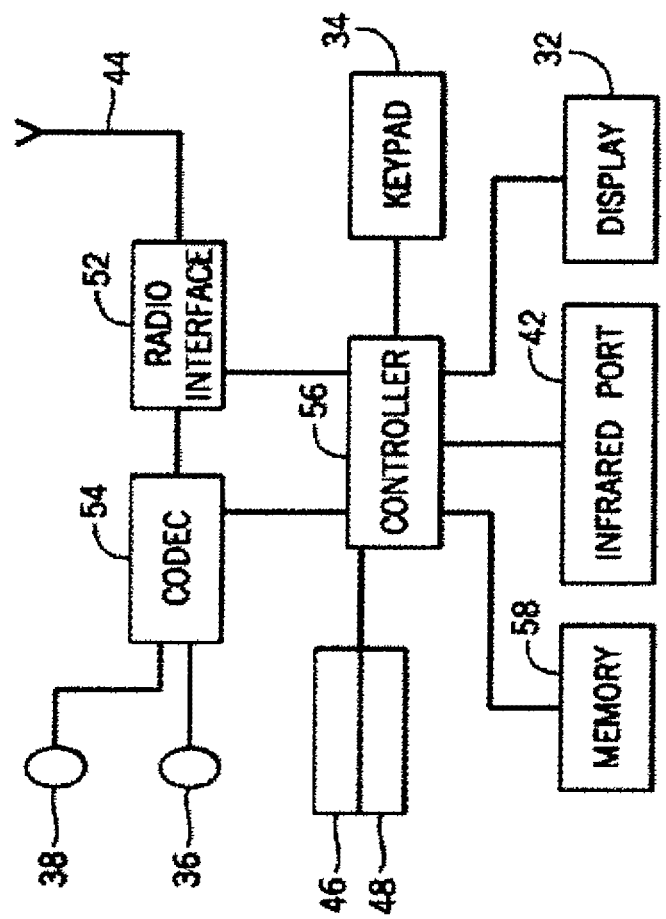
FIG. 12 is a schematic representation of the circuitry which may be included in the electronic device of FIG. 11.

FIGS. 11 and 12 show one representative electronic device 12 within which the present invention may be implemented. It should be understood, however, that the present invention is not intended to be limited to one particular type of device. The electronic device 12 of FIGS. 11 and 12 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
transmitting a request from a user device, the request including a query for information;
receiving an identifier at the user device, the identifier being associated with one or more authentication mechanisms for obtaining access to emergency services;
transmitting the identifier for receipt by an authentication server; and
receiving an authentication from the authentication server based at least in part on the identifier.

2. The method of claim 1, wherein the request is transmitted for receipt by an information provider, and wherein the information provider comprises at least one of an access point, an information server, or the authentication server.

3. The method of claim 1, wherein the identifier is associated with the one or more authentication mechanisms by way of a tuple formed by the identifier and an indication of the one or more authentication mechanisms.

4. The method of claim 1, wherein the one or more authentication mechanisms are selected as being supported by the user device.

5. The method of claim 1, wherein the identifier is adapted to be used in an extensible authentication protocol exchange with the authentication server.

6. The method of claim 1, wherein the identifier is associated with at least one of an authentication protocol, a dummy authentication lacking link security, or an open authentication system service identification without credentials.

7. The method of claim 1, wherein the identifier is in a resource description framework format.

8. An apparatus, comprising:
at least one processor; and
at least one memory including computer program code, the at least one processor, the at least one memory, and the computer program code configured to cause the apparatus to at least:
transmit a request by a user device, the request including a query for information;
receive an identifier at the user device, the identifier being associated with one or more authentication mechanisms for obtaining access to emergency services;
transmit the identifier for receipt by an authentication server; and
receive an authentication from the authentication server based at least in part on the identifier.

9. The apparatus of claim 8, wherein the one or more authentication mechanisms are selected as being supported by the user device.

10. The apparatus of claim 8, wherein the identifier is in a resource description framework format.

11. The apparatus of claim 8, wherein the identifier is adapted to be used in an extensible authentication protocol exchange with the authentication server.

12. The apparatus of claim 8, wherein the request is transmitted for receipt by an information provider, and wherein the information provider comprises at least one of an access point, an information server, or the authentication server.

13. The apparatus of claim 8, wherein the identifier is associated with the one or more authentication mechanisms by way of a tuple formed by the identifier and an indication of the one or more authentication mechanisms.

14. The apparatus of claim 8, wherein the identifier is associated with at least one of an authentication protocol, a dummy authentication lacking link security, or an open authentication system service identification without credentials.

15. A non-transitory computer-readable medium encoded with instructions that, when executed by at least one processor, perform at least the following:
transmitting a request from a user device, the request including a query for information;
receiving an identifier at the user device, the identifier being associated with one or more authentication mechanisms for obtaining access to emergency services;
transmitting the identifier for receipt by an authentication server; and
receiving an authentication from the authentication server based at least in part on the identifier.

16. The non-transitory computer-readable medium of claim 15, wherein the request is transmitted for receipt by an information provider, and wherein the information provider comprises at least one of an access point, an information server, or the authentication server.

17. The non-transitory computer-readable medium of claim 15, wherein the identifier is associated with the one or more authentication mechanisms by way of a tuple formed by the identifier and an indication of the one or more authentication mechanisms.

18. The non-transitory computer-readable medium of claim 15, wherein the one or more authentication mechanisms are selected as being supported by the user device.

19. The non-transitory computer-readable medium of claim 15, wherein the identifier is adapted to be used in an extensible authentication protocol exchange with the authentication server.

20. The non-transitory computer-readable medium of claim 15, wherein the identifier is associated with at least one of an authentication protocol, a dummy authentication lacking link security, or an open authentication system service identification without credentials.

21. The non-transitory computer-readable medium of claim 15, wherein the identifier is in a resource description framework format.

* * * * *